United States Patent
Bang

(10) Patent No.: US 12,518,217 B2
(45) Date of Patent: Jan. 6, 2026

(54) METHOD FOR MANAGING LOCAL AND GLOBAL MODELS ON AN ARTIFICIAL INTELLIGENCE PLATFORM

(71) Applicant: AIV Co., Ltd., Yongin-si (KR)

(72) Inventor: Seongdeok Bang, Seoul (KR)

(73) Assignee: AIV Co., Ltd., Yongin-si (KR)

( * ) Notice: Subject to any disclaimer, the term of this patent is extended or adjusted under 35 U.S.C. 154(b) by 0 days.

(21) Appl. No.: 19/220,466

(22) Filed: May 28, 2025

(65) Prior Publication Data

US 2025/0371422 A1 Dec. 4, 2025

(30) Foreign Application Priority Data

Jun. 4, 2024 (KR) .................. 10-2024-0072827

(51) Int. Cl.
*G06N 20/00* (2019.01)
(52) U.S. Cl.
CPC .................. *G06N 20/00* (2019.01)
(58) Field of Classification Search
CPC ....................................................... G06N 20/00
See application file for complete search history.

(56) References Cited

U.S. PATENT DOCUMENTS

| | | | | |
|---|---|---|---|---|
| 2022/0391778 A1* | 12/2022 | Green | ............ | G06N 20/20 |
| 2023/0351157 A1 | 11/2023 | Namgoong et al. | | |
| 2024/0070531 A1* | 2/2024 | Mukherjee | ............ | G06N 20/00 |

FOREIGN PATENT DOCUMENTS

| | | |
|---|---|---|
| KR | 1020200141835 A | 12/2020 |
| KR | 102413116 B1 | 6/2022 |
| KR | 1020220136855 A | 10/2022 |
| KR | 102479793 B1 | 12/2022 |
| KR | 1020230052880 A | 4/2023 |
| KR | 1020230055738 A | 4/2023 |
| KR | 102544531 B1 | 6/2023 |
| KR | 102552230 B1 | 7/2023 |
| KR | 1020240072908 A | 5/2024 |

OTHER PUBLICATIONS

Ormos, Leopold. "Evaluation of MLOps approaches and implementation of a data product development pipeline." PhD diss., University of Stuttgart, 2024. (Year: 2024).*

(Continued)

*Primary Examiner* — Casey R. Garner
(74) *Attorney, Agent, or Firm* — Harter Secrest & Emery LLP; Jodi A. Reynolds, Esq.

(57) ABSTRACT

Disclosed is a method for managing a local model and a global model on an AI platform, the method performed by one or more processors of a computing device according to an exemplary embodiment of the present disclosure.

the method may include: obtaining one or more encoded reference information, generated by encoding task information or data type information related to local training performed by one or more local servers; obtaining at least a part of parameter information of one or more local models locally trained by the one or more local servers; and updating a global model based on the one or more encoded reference information and at least a part of the parameter information of the one or more local models.

17 Claims, 6 Drawing Sheets

(56) References Cited

OTHER PUBLICATIONS

Wang, Hongyi, Mikhail Yurochkin, Yuekai Sun, Dimitris Papailiopoulos, and Yasaman Khazaeni. "Federated learning with matched averaging." arXiv preprint arXiv:2002.06440 (2020). (Year: 2020).*
Seung-Hoo Hong et al., "The Study on the Implementation Approach of MLOps on Federated Learning System", Journal of Internet Computing and Services (JICS), Jun. 23, 2022, pp. 97-110, Korea.
Hyungbin Kim et al., "Efficient Distributed Clustering Algorithm for Large-Scale Federated Learning", The Journal of Korean Institute of Communications and Information Sciences, Jan. 2022, pp. 198-205, vol. 47, Korea.

* cited by examiner

METHOD FOR MANAGING LOCAL AND GLOBAL MODELS ON AN ARTIFICIAL INTELLIGENCE PLATFORM

CROSS-REFERENCE TO RELATED APPLICATIONS

This application claims priority to and the benefit of Korean Patent Application No. 10-2024-0072827 filed in the Korean Intellectual Property Office on Jun. 4, 2024, the entire contents of which are incorporated herein by reference.

TECHNICAL FIELD

The present disclosure relates to a method for managing a local model and a global model on an artificial intelligence platform.

BACKGROUND ART

Systems in an artificial intelligence (AI) industry stably provide services through a continuous operation. At this time, if development and operation are performed separately, various inefficiency problems such as data silos, etc., may occur. It is relatively easy to develop and distribute an artificial intelligence (AI) model, but since a lot of resources are required to maintain and upgrade the AI model, a machine learning operations (MLOps) platform may be used to efficiently solve a lot of resources required. For reference, the Machine Learning Operations (MLOps) platform is an integrated system for efficiently managing the development, deployment, and operation of machine learning models.

Korean Patent Application Publication No. 10-2024-0072908 (May 24, 2024) discloses a machine learning platform system including a machine learning task function.

SUMMARY OF THE INVENTION

The present disclosure has been made in an effort to provide a method for managing a local model and a global model in an artificial intelligence platform which may generate a global model specific to a specific task by obtaining one or more encoded reference information, generated by encoding task information or data type information for local learning of one or more local servers, in a machine learning operations (MLOps) platform implemented by interlocking with a central server and one or more local servers.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method for managing a local model and a global model on an AI platform, the method performed by a computing device. The method may include: obtaining one or more encoded reference information, generated by encoding task information or data type information related to local training performed by one or more local servers; obtaining at least a part of parameter information of one or more local models locally trained by the one or more local servers; and updating a global model based on the one or more encoded reference information and at least a part of the parameter information of the one or more local models.

In an embodiment of the present disclosure, the AI platform includes an MLOps (Machine Learning Operations) platform implemented through interconnection between a central server and the one or more local servers, wherein the central server performs operations of managing a frontend operation of the MLOps platform, an authentication operation, and an operation for managing information about the one or more local models and the global model, and wherein each of the one or more local servers performs operations of managing the backend operation of the MLOps platform and managing information regarding each of the one or more local models.

In an embodiment of the present disclosure, the one or more local models and the global model are trained based on federated learning.

In an embodiment of the present disclosure, the one or more local models shares a same hidden layer architecture.

In an embodiment of the present disclosure, the method may further include clustering the one or more local models based on the one or more encoded reference information, and updating of the global model may include updating the first global model by using parameter information of local models included in a first cluster; and updating a second global model by using parameter information of local models included in a second cluster.

In an embodiment of the present disclosure, the clustering the one or more local models may include including models among the one or more local models in a same cluster when a similarity of encoded reference information between the local models is equal to or greater than a threshold.

In an embodiment of the present disclosure, the updating of the global model may further include generating first representative reference information for the first cluster by computing a representative value from encoded reference information of local models included in the first cluster; generating second representative reference information for the second cluster by computing a representative value from encoded reference information of local models included in the second cluster; using the first representative reference information as tag information of an updated first global model; and using the second representative reference information as tag information of an updated second global model.

In an embodiment of the present disclosure, the obtaining one or more encoded reference information and the obtaining at least the part of the parameter information of the one or more local models are performed with a time difference.

In an embodiment of the present disclosure, the obtaining one or more encoded reference information is performed before an operation of identifying a model among the one or more local models to be used for updating the global model, wherein the obtaining at least the part of the parameter information of the one or more local models is performed after the operation of identifying the model among the one or more local models to be used for updating the global model, and is performed for the identified model.

Another exemplary embodiment of the present disclosure provides a computer program stored in a non-transitory computer readable medium. The computer program may cause one or more processors to perform operations for managing a local model and a global model on an AI platform when the computer program is executed by the one or more processors, and the operations may include: an operation of obtaining one or more encoded reference information, generated by encoding task information or data type information related to local training performed by one or more local servers; an operation of obtaining at least a part of parameter information of one or more local models locally trained by the one or more local servers; and an operation of updating a global model based on the one or more encoded reference information and at least a part of the parameter information of the one or more local models.

In an embodiment of the present disclosure, the AI platform includes an MLOps (Machine Learning Operations) platform implemented through interconnection between a central server and the one or more local servers, wherein the central server performs operations of managing a frontend operation of the MLOps platform, an authentication operation, and an operation for managing information about the one or more local models and the global model, and wherein each of the one or more local servers performs operations of managing a backend operation of the MLOps platform and managing information regarding each of the one or more local models.

In an embodiment of the present disclosure, the one or more local models and the global model are trained based on federated learning.

In an embodiment of the present disclosure, the one or more locals model shares a same hidden layer architecture.

In an embodiment of the present disclosure, the operation may further comprise an operation of clustering the one or more local models based on the one or more encoded reference information, and the operation of updating of the global model may include an operation of updating the first global model by using parameter information of local models included in a first cluster; and an operation of updating a second global model by using parameter information of local models included in a second cluster.

In an embodiment of the present disclosure, the clustering the one or more local models may include including models among the one or more local models in a same cluster when a similarity of encoded reference information between the local models is equal to or greater than a threshold.

In an embodiment of the present disclosure, the operation of obtaining one or more encoded reference information and the operation of obtaining at least the part of the parameter information of the one or more local models are performed with a time difference.

In an embodiment of the present disclosure, the obtaining one or more encoded reference information is performed before an operation of identifying a model among the one or more local models to be used for updating the global model, wherein the obtaining at least the part of the parameter information of the one or more local models is performed after the operation of identifying the model among the one or more local models to be used for updating the global model, and is performed for the identified model.

Yet another exemplary embodiment of the present disclosure provides a computing device that manages a local model and a global model in an AI platform. The device may include: at least one processor; and a memory, wherein the at least one processor is configured to: obtain one or more encoded reference information, generated by encoding task information or data type information related to local training performed by one or more local servers; obtain at least a part of parameter information of one or more local models locally trained by the one or more local servers; and update a global model based on the one or more encoded reference information and at least a part of the parameter information of the one or more local models.

In an embodiment of the present disclosure, the AI platform includes an MLOps (Machine Learning Operations) platform implemented through interconnection between a central server and the one or more local servers, wherein the central server performs operations of managing a frontend operation of the MLOps platform, an authentication operation, and an operation for managing information about the one or more local models and the global model, and wherein each of the one or more local servers performs operations of managing a backend operation of the MLOps platform and managing information regarding each of the one or more local models.

In an embodiment of the present disclosure, the one or more local models and the global model are trained based on federated learning.

In an embodiment of the present disclosure, the one or more local models shares a same hidden layer architecture.

In an embodiment of the present disclosure, the at least one processor is further configured to cluster the one or more local models based on the one or more encoded reference information, and wherein the updating of the global model may include updating the first global model by using parameter information of local models included in a first cluster; and updating a second global model by using parameter information of local models included in a second cluster.

In an embodiment of the present disclosure, wherein the obtaining one or more encoded reference information and the obtaining at least the part of the parameter information of the one or more local models are performed with a time difference.

According to an exemplary embodiment of the present disclosure, encoded reference information is used to cluster models, thereby reducing unnecessary parameter transmission between unrelated models, which may contribute to reducing network resources and communication costs.

Further, according to an exemplary embodiment of the present disclosure, only models with high correlation through clustering are merged and updated, thereby increasing efficiency of computational resources and reducing a time required for global model update.

Meanwhile, the effects of the present disclosure are not limited to the above-mentioned effects, and various effects can be included within the scope which is apparent to those skilled in the art from contents to be described below.

DETAILED DESCRIPTION

Figure 1:
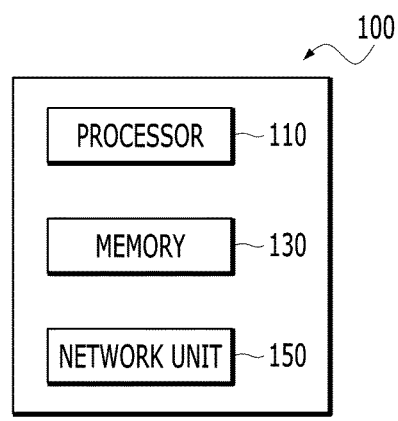
FIG. 1 is a block diagram of a computing device for managing a local model and a global model in an artificial intelligence platform according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined". Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for managing local and global models in an artificial intelligence platform according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for training the neural network. The processor 110 may perform calculations for training the neural network, which include processing of input data for training in deep learning (DL), extracting a feature in the input data, calculating an error, updating a weight of the neural network using backpropagation, and the like. At least one of the CPU, GPGPU, and TPU of the processor 110 may process training of a network function. For example, both the CPU and the GPGPU may process the training of the network function and data classification using the network function. Further, in an exemplary embodiment of the present disclosure, processors of a plurality of computing devices may be used together to process the training of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 150 presented in the present disclosure may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

Figure 2:
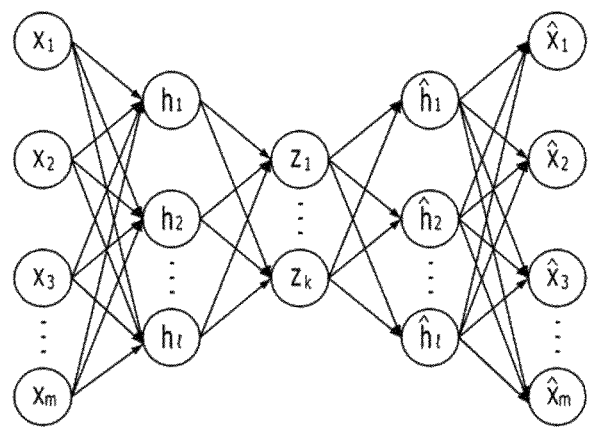
FIG. 2 is a conceptual view illustrating a neural network according to an exemplary embodiment of the present disclosure.

FIG. 2 is a conceptual view illustrating a neural network according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

The present disclosure relates to a method for managing a local model and a global model on an artificial intelligence platform performed by a computing device 100. Meanwhile, the computing device 100 described below may be a central server of federated learning, a Master server in a Hybrid MLOps environment, or a Master server in an MLOps environment. In other words, the computing device 100 may be a server that efficiently manages a machine learning operation in the hybrid MLOps environment. Further, the computing device 100 may perform functions such as central management and orchestration, task scheduling, data and model synchronization, security and access control, monitoring and logging, automation and pipeline management, model registry and management, and the like to optimally use on-premises and cloud resources. This may support efficient development, deployment, and monitoring of a machine learning model.

Figure 3:
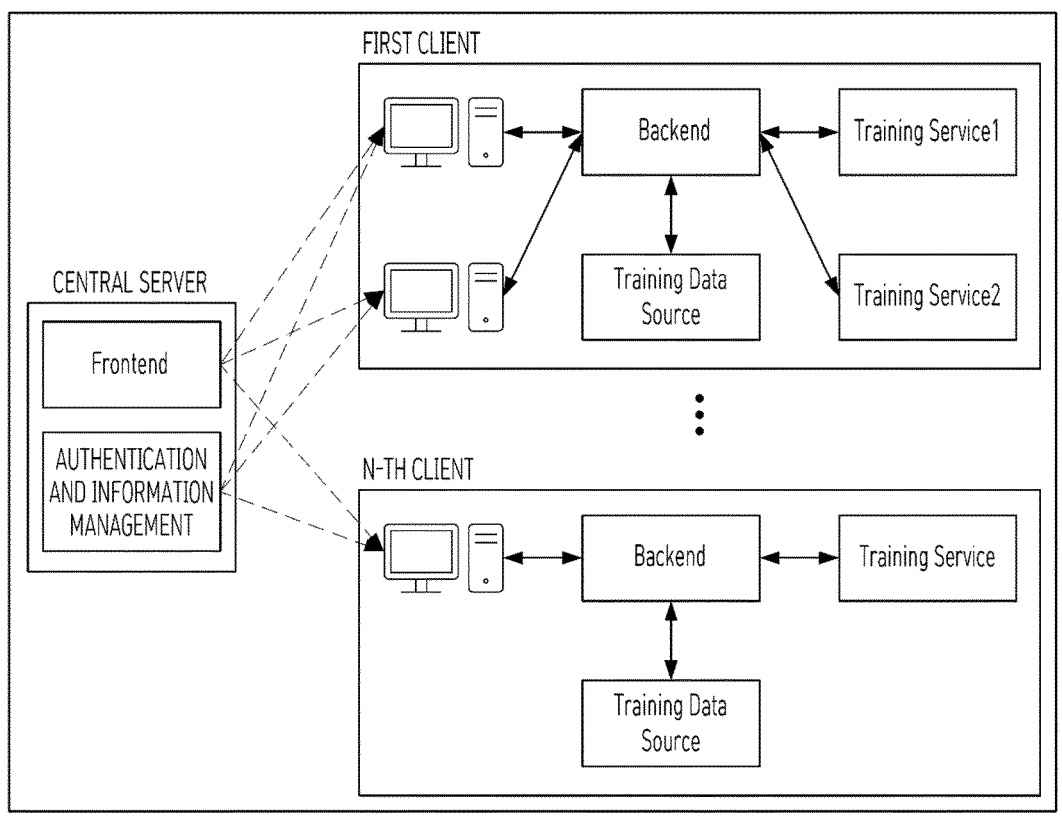
FIG. 3 is a diagram schematically illustrating the artificial intelligence platform according to an exemplary embodiment of the present disclosure.

FIG. 3 is a diagram schematically illustrating the artificial intelligence platform according to an exemplary embodiment of the present disclosure.

Referring to FIG. 3 according to an exemplary embodiment of the present disclosure, the artificial intelligence platform may include a machine learning operations (MLOps) platform implemented by interlocking a central server and one or more local servers. For reference, the Machine Learning Operations (MLOps) platform is an integrated system for efficiently managing the development, distribution, and operation of machine learning models. The artificial intelligence platform may be a hybrid Machine Learning Operations (MLOps) platform that may perform up-to-date learning code and program security updates over a cloud while maintaining an on-premises system for data security. Meanwhile, the artificial intelligence platform plays an important role in increasing a productivity of machine learning models, reducing operational complexity, and improving stability and reliability, thereby enabling enterprises to develop and deploy artificial intelligence (AI) or machine learning (ML) solutions more quickly and efficiently.

According to an exemplary embodiment, the "central server" may perform a frontend operation, an authentication operation, and an operation of managing information on one or more local models and a global model of the MLOps platform. Further, the central server may be used as a public cloud and perform various operations related to the learning of machine learning. As an example, the front-end operation may include providing a web-based UX/UI or application UX/UI for a user to monitor and control a model learning process and visualizing a learning state of the model, performance metrics, data distributions, and the like. Further, the front-end operation may include an operation of performing, by a user, labeling of a data set to be used for model learning by providing the web-based UX/UI or application UX/UI. Further, the authentication operation may include a user authentication operation of maintaining the system security through user log-in, access authorization management, etc. In addition, the authentication operation may include an API authentication operation of performing API authentication and authorization verification for safe communication with one or more local servers. Further, the managing operation may include an operation of updating the global model by integrating model parameters collected from the one or more local servers. Further, the managing operation may include an operation of managing versions of the global model and one or more local models. Further, the managing operation may include an operation of distributing the updated global model to one or more local servers. In addition, the managing operation may also include an operation of managing a workspace and a project. As an example, the central server may perform a function of supporting collaboration among a data scientist, an engineer, and a business analyst, and authorization management or experiment management. Further, the central server may also monitor a performance of a distributed model, and perform drift detection, retraining, and version management. At this time, the central server may obtain text based data in one or more local servers in order to manage information on one or more local models.

According to an exemplary embodiment, the "local server" may perform a backend operation of the MLOps platform, and an operation of managing information for each local model. The backend of the MLOps platform may be an internal network of the local server. In addition, the backend as a management system of the local server may adjust local training data management and a learning task. Further, the backend may obtain local training data (training data source) for training a local model via at least one of a local file system, a database, a data lake, a data warehouse, or an IoT device and a sensor. As an example, the local training data may include an image data type, a text data type, a video data type, a voice data type, a sensing data type, a table data type, a graph data type, etc.

According to an exemplary embodiment, a client with the local server included in an artificial intelligence platform may have a system that includes one or more on-premise PCs, a backend, one or more training services. For reference, the "on-premises PC" may refer to a computer or server that is physically installed and operated within a user's location (e.g., an office, data center, or personal home).

Exemplarily, the on-premises PC may be a computer that performs data processing and model training tasks in a local environment. In addition, the on-premise PC may load the local training data source provided by the backend, and preprocess (e.g., normalize, augment, etc.) the local training data to convert the local training data into a form suitable for training. In addition, the on-premise PC may prepare placement of the local training data, and deliver the local training data that is ready for placement to each training service. For example, in the case of handling large-scale video data, a technique of reducing a dimension of data and storing only necessary information is important. By considering this, the on-premise PC may use an efficient feature compression technique to reduce a data capacity by compressing the local training data and preserving important information. For example, the on-premise PC may load local training data of a video type, and then perform data pre-processing and feature compression. The on-premise PC may process image data with a Convolutional Neural Network (CNN) or the like to extract a main feature, and compress data by using a dimension reduction technique (PCA, t-SNE, or the like), but is not limited thereto. In addition, the on-premise PC may also use the compressed local training data as training data of the local model or transmit the compressed local training data to the backend. Meanwhile, by compressing the local training data by using the feature compression technique in the on-premise PC, raw data of the client is not leaked, and resources required for data transmission may be optimized.

Exemplarily, the backend may be a server that adjusts training services with on-premise PCs and performs the local training data and local model management. For example, a backend may actually be a physical server, and may refer to a software server environment. Further, the backend may obtain and manage the local training data (training data source) for training the local model via at least one of the local file system, the database, the data lake, the data warehouse, or the IoT device and the sensor. In addition, the backend may adjust a training task between the on-premise PC and the training service, allocate the training task to each on-premised PC and service, and monitor a progress state. Further, the backend may store and manage parameters of the trained local model. Further, the backend may transmit parameters for some or all of the parameter information for the local model to the central server. As an example, in a process of handling a large amount of video data, not all data may have equal importance. By considering this, the backend may use an active learning technique to automatically select an important data point where the model may be most effective. As a result, effective training may be performed while minimizing the amount of data transmitted from the on-premise PC installed in the client to the backend (server).

Exemplarily, the training service may train and evaluate the local model using data prepared by the on-premise PC. In addition, one or more training services may process different data placements or perform training with different hyperparameters. Further, the training service may evaluate the performance of the trained local model and store local model parameters and evaluation results in the backend.

Exemplarily, referring to FIG. 3, in a machine learning operations (MLOps) platform implemented by interlocking the central server and one or more local servers, the central server may generate and distribute an initial global model to a first client to an N-th client. As an example, a backend of the first client may obtain a first local training data source, and deliver the first local training data source to a first on-premise PC and a second on-premise PC. Further, the first on-premise PC and the second on-premise PC of the first client load and preprocess the first local training data to prepare for training. Further, the first on-premise PC and the second on-premise PC of the first client may deliver the prepared first local training data to a first training service and a second training service, respectively. In addition, the first training service and the second training service of the first client may train each model (a 1-$1^{st}$ local model, a 1-$2^{nd}$ local model) by using the first local training data, and evaluate performance. Further, each of the first on-premise PC and the second on-premise PC of the first client may transmit parameters of the model trained in each of the first learning service and the second learning service to the backend. Further, the backend of the first client may integrate the collected parameters to update a first local model. Further, the backend of the first client may transmit a first local model parameter to the central server. A backend of the N-th client, which uses the artificial intelligence platform through the same method as above, may obtain an N-th local training data source and deliver the obtained N-th local training data source to the N-th on-premise PC. The on-premise PC of the N-th client may load and preprocess the N-th local training data to prepare for training. Further, the on-premise PC of the N-th client may deliver the prepared N-th local training data to the training service. In addition, the training service of the N-th client may use the N-th local training data to train an N-th model, and evaluate performance. Further, the on-premise PC of the N-th client may transmit, to the backend, parameters of the N-th model trained in the training service. Further, the backend of the N-th client may integrate the collected parameters to update an N-th local model. In addition, the backend of the N-th client may transmit an N-th local model parameter to the central server. Meanwhile, the central server may integrate the model parameters collected from one or more local servers to update the global model, and distribute the updated global model to one or more local servers again.

Figure 4:
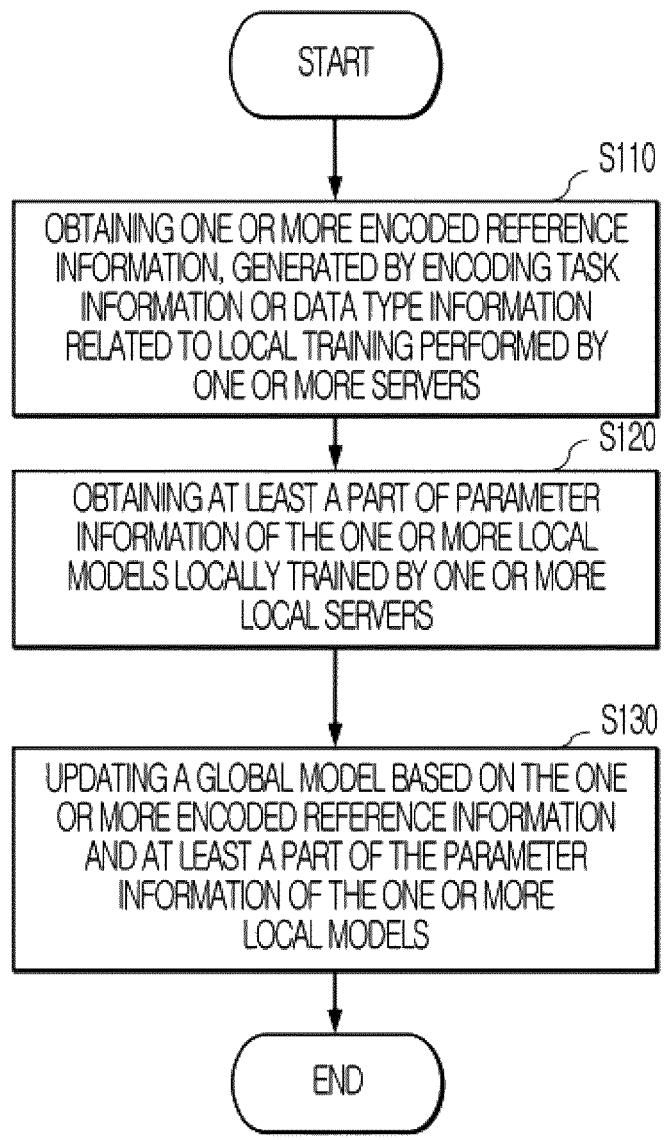
FIG. 4 is a flowchart illustrating a method for managing a local model and a global model in an artificial intelligence platform according to an exemplary embodiment of the present disclosure.
Figure 5:
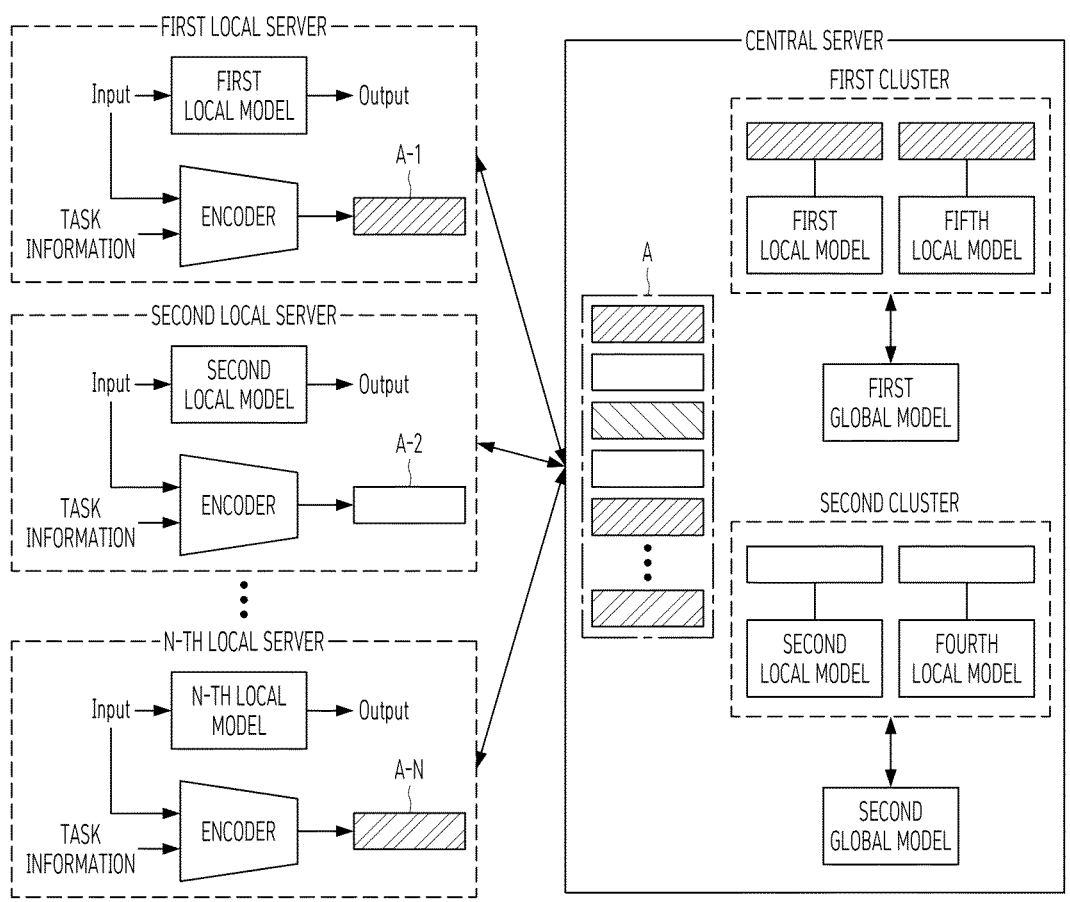
FIG. 5 is a diagram schematically illustrating an operation of updating a global model based on at least a part of one or more encoded reference information and parameter information for one or more local models according to an exemplary embodiment of the present disclosure.

FIG. 4 is a flowchart illustrating a method for managing a local model and a global model in an artificial intelligence platform according to an exemplary embodiment of the present disclosure and FIG. 5 is a diagram schematically illustrating an operation of updating a global model based on at least a part of one or more encoded reference information and parameter information for one or more local models according to an exemplary embodiment of the present disclosure. For reference, the method of managing the local model and the global model in the artificial intelligence platform illustrated in FIG. 4 may be performed by the computing device 100. The computing device 100 is the central server illustrated in the figure.

According to an exemplary embodiment of the present disclosure, one or more local models and global models described below may be trained based on federated learning. Further, one or more local models may share the same hidden layer architecture. In other words, one or more local models may use the hidden layer architecture distributed from the computing device 100 to perform training of the one or more local models. Further, the computing device 100 may update the global model based on at least some of the parameters for one or more local models obtained from one or more local servers.

According to an exemplary embodiment of the present disclosure, the computing device 100 may obtain one or more encoded reference information generated by encoding task information or data type information for local training of one or more local servers (S110). For example, the task information for the local training may include natural language processing (NLP) including text classification, text generation, object recognition, or text summary. In addition, the task information may include image processing (computer vision) including object detection, image classification, image generation, face recognition, and the like. Further, the task information may include time series data analysis including time series prediction, anomaly detection, time series classification, and the like. In addition, the task information may include voice recognition, voice generation, emotion analysis, and the like. Further, the task information may include tabular data analysis for performing regression analysis, classification analysis, or cluster analysis. Further, the task information may include reinforcement learning including game agent learning or robot control. Further, the task information may include graph analysis including node classification, edge analysis, or graph clustering. However, the task information for the local training is not limited thereto, and the task information indicates a task or a goal performed by the local server, and such task information may include information for generating an output desired by the local model for given input data (local data set). As an example, the task information may include a task description (e.g., semiconductor defect detection, image classification, anomaly detection, etc.), a task type (e.g., regression, classification, clustering, time series prediction, etc.) or a target metric (e.g., accuracy, F1 score, Mean Squared Error (MSE), etc.).

Exemplarily, the data type information may include an image data type, a text data type, a video data type, a voice data type, a sensing data type, a table data type or a graph data type, or the like, as information related to a type of local data set used for local training in each local server. As another example, the data type information may include data format information (e.g., image, text, audio, video, etc.), data source information (e. g., sensor data, user input, web crawling, etc.), data structure information (e.g., fixed length sequence, variable length sequence, 2D image, etc.) or data sampling attribute information (e.g., sampling period or data resolution, etc.).

According to an exemplary embodiment, one or more local servers (e.g. a first local server, a second local server . . . , an N-th local server) may each include a local model that performs a specific task and an encoder that encodes task information or data type information for local training to generate encoded reference information. For example, the encoded reference information may be used as tag information of each local model. As an example, the tag information may include a local model identifier (ID) that may uniquely identify the local model, data type information, and task information. In addition, the data type information included in the tag information may specify what kind of data the local model processes. In addition, the task information included in the tag information may specify a characteristic of a task performed by the local model. Since the tag information is very small compared to weight or gradient information of the local model, the tag information may be quickly transmitted to the central server. Then, when performing actual federated learning, the central server may effectively integrate the parameter information of the local model and update the global model based on tag information of one or more models.

According to an exemplary embodiment, one or more local servers (e.g. a first local server to an N-th local server)

may each include a local model that performs a specific task and an encoder that encodes task information or data type information for training the local model to generate encoded reference information. Exemplarily, the central server may distribute the encoder to one or more local servers to enable consistency maintenance and management. In this regard, since encoding is performed on the same reference in one or more local models, the central server may easily manage the distributed encoder, and when improvement or bug correction of the encoder is needed, the central server may perform updating at a time.

Exemplarily referring to FIG. 5, the first local server may include a first local model that performs a specific task and a first encoder that encodes task information or data type information for training the first local model to generate first encoded reference information A-1. For example, the data type information obtained from the first local model may include a data format: an image, a data source: a first factory inspection system, a data structure: a 2D image, and a data sampling attribute: a high-resolution image (1024*1024 pixels). Further, the task information for the training of the first local model may include task description: semiconductor defect detection, task type: image classification, and target metric: accuracy. For example, the first encoder may encode task information or data type information for training the first local model to generate the first encoded reference information A-1 as [first local model, data type: image, task: semiconductor defect detection]. Further, the second local server may include a second local model that performs a specific task and a second encoder that encodes task information or data type information for training the second local model to generate second encoded reference information A-2. For example, the data type information obtained from the second local model may include a data format: an image, a data source: a second factory inspection system, a data structure: a 2D image, and a data sampling attribute: a high-resolution image (1024*1024 pixels). Further, the task information for the training of the second local model may include task description: glass defect detection, task type: image classification, and target metric: F1 score. For example, the second encoder may encode task information or data type information for training the second local model to generate the second encoded reference information A-2 as [second local model, data type: image, task: glass defect detection]. Similar to the operations described above, the computing device 100 may obtain first encoded reference information A-1, second encoded reference information A-2, . . . , and N-th encoded reference information A-N from the first local server to the N-th local server, respectively.

According to an exemplary embodiment of the present disclosure, the computing device 100 may obtain at least a part of parameter information for one or more local models, which is locally trained by one or more local servers (S120). For reference, the computing device 100 may perform an operation S110 of obtaining the one or more encoded reference information and an operation S120 of obtaining at least a part of the parameter information for the one or more local models with a time difference from each other. As an example, the parameter information for the one or more local models may include learned parameters such as weights, biases, etc., of the model trained in the local server. Exemplarily, the computing device 100 may (i) obtain all parameter information for one or more local models locally trained by one or more local servers. Further, the computing device 100 may (ii) identify models to be used for updating the global model among one or more local models, and obtain parameter information for one or more identified local models.

According to an exemplary embodiment, the computing device 100 may (i) obtain all parameter information for one or more local models locally trained by one or more local servers. The computing device 100 may also obtain parameter information for the local model that is not used to update the global model. Meanwhile, in a process of transmitting the parameters of the one or more local models, a problem that a communication cost may increase may occur. By considering this, the computing device 100 may use the obtained encoded reference information to, after identifying one or more local models to be used for updating the global model, obtain the parameter information for the one or more identified local models and perform the updating of the global model.

According to an exemplary embodiment of the present disclosure, the computing device 100 may (ii) identify models to be used for updating the global model among one or more local models. At this time, the computing device 100 may identify models to be used for updating the global model among one or more local models after step S110 described above. Further, the computing device 100 may identify the models to be used for updating the global model among one or more local models before step S120 described below.

According to an exemplary embodiment, the computing device 100 may cluster one or more local models based on one or more encoded reference information in order to identify the models to be used for updating the global model among one or more local models. Further, the computing device 100 may include models in which a similarity of encoded reference information is equal to or larger than a threshold among one or more local models in the same cluster. Further, the computing device 100 may identify one or more local models included in the same cluster as the model to be used for updating the global model. Meanwhile, the computing device 100 may not obtain parameter information for one or more local models not included in the same cluster.

Exemplarily, referring to FIG. 5, the computing device 100 may obtain one or more encoded reference information A. The one or more encoded reference information (A) may include first encoded reference information A-1 [first local model, data type: image, task: semiconductor defect detection], second encoded reference information A-2 [second local model, data type: image, task: glass defect detection], third encoded reference information A-3 [third local model, data type: text, task: client feedback analysis], fourth encoded reference information A-4 [fourth local model, data type: moving image, task: glass defect detection], fifth encoded reference information A-5 [fifth local model, data type: moving image, task: semiconductor defect detection], . . . , N-th encoded reference information A-N [N-th local model, data type: voice, task: machine defect detection]. In addition, the computing device 100 may embed one or more encoded reference information A into vectors, and calculate a similarity between the embedded vectors. As an example, an algorithm for computing the similarity may adopt any one of a cosine similarity, a Euclidean distance, a semantic similarity, or a clustering algorithm, but is not limited thereto, and an algorithm that is previously developed or will be developed in the future may be applied. For example, by considering a similarity calculation result, the computing device 100 may include models, in which a similarity of encoded reference information is equal to or larger than a threshold among one or more local models, in the same cluster.

Referring back to FIG. 5 in this regard, a first cluster may include a first local model and a fifth local model. Further, a second cluster may include a second local model and a fourth local model. For example, the computing device 100 may identify the first cluster in order to perform an update of the first global model, and identify the second cluster in order to perform an update of the second global model. In other words, the computing device 100 may obtain parameter information for one or more local models included in the first cluster in order to perform the update of the first global model. Further, the computing device 100 may obtain parameter information for one or more local models included in the second cluster in order to perform the update of the second global model. Meanwhile, the computing device 100 includes the models whose similarity is equal to or larger than the threshold in the same cluster based on the encoded reference information, thereby facilitating efficient management of the models and optimization of federated learning.

According to an exemplary embodiment of the present disclosure, the computing device 100 may update the global model based on at least a part of one or more encoded reference information and parameter information for one or more local models (S130). For example, the computing device 100 may identify only important parameter information among all parameters for one or more local models locally trained by one or more local servers. As an example, the computing device 100 may identify parameters that are changed significantly in value during a particular training period (parameters with large changes) or parameters that exceed a specific criterion (e.g., slope magnitude) (significant parameters) as important parameter information among parameters for one or more local models. Further, the computing device 100 may consider a weight magnitude or a weight slope to identify important parameter information of parameters for the one or more local models. Meanwhile, the computing device 100 may identify and use only the one or more encoded reference information and the important parameter information for the one or more local models for updating the global model, thereby increasing network efficiency and enhancing security, thereby maximizing the benefits of federated learning and effectively improving the performance of the global model. As another example, the computing device 100 may update the global model by analyzing one or more encoded reference information and parameter information for one or more local models. For example, the computing device 100 may use the one or more encoded reference information to determine characteristics and relevancy of the local model through information about which data types or tasks the local model is dealing with. Further, the computing device 100 may update the global model by using parameter information about the local model by considering the determine characteristics and relevancy of the local model.

According to an exemplary embodiment, the computing device 100 may use parameter information of one or more local models, included in the first cluster described above with respect to FIG. 5, to update the first global model. As an example, the computing device 100 may integrate parameters of the first local model and the fifth local model included in the first cluster to generate average parameter information, and may use the integrated parameter information to update the first global model. The first global model may be updated to a model optimized for semiconductor defect detection.

Meanwhile, the computing device 100 may integrate knowledge of one or more models included in each cluster to generate a global model that shows a higher performance for a specific task. Further, the computing device 100 may build a generalized model for a specific task by reflecting specialized data of one or more local servers, and update a global model for each cluster, so that efficient learning may be performed while maintaining the model specialized for the specific task. Further, the computing device 100 may group local models, which perform similar tasks, through clustering, such that the models in each cluster share expertise for a specific domain. This allows each global model to show a performance optimized for a specific task (e.g.: semiconductor defect detection, glass defect detection). Further, by clustering the models by using the encoded reference information, unnecessary parameter transmission between unrelated models may be reduced, which may contribute to reducing network resources and communication costs. Further, the computing device 100 merges and updates only models with high correlation through clustering, thereby increasing efficiency of computational resources and reducing a time required for global model update. Further, data privacy of each local server may be maintained by transmitting only encoded reference information without directly transmitting data from the local server to the central server.

Figure 6:
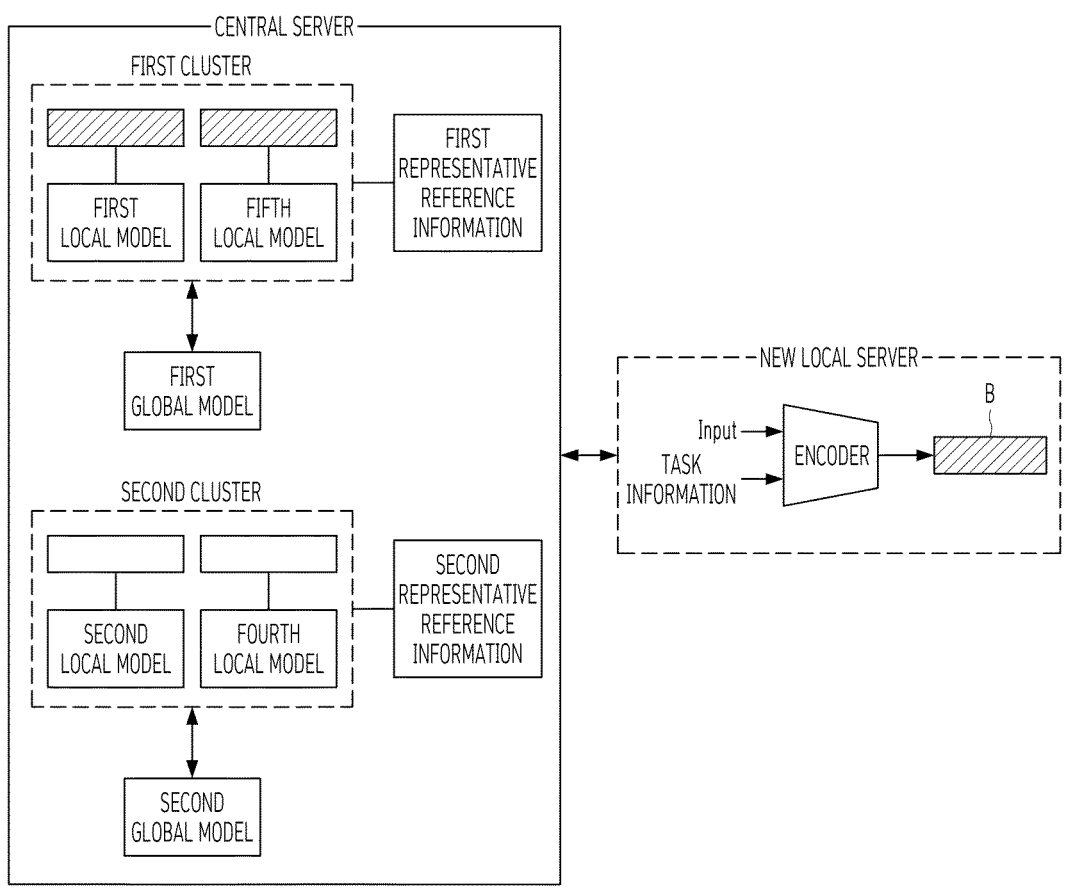
FIG. 6 is a diagram for describing an operation of sharing a hidden layer architecture of any one of a plurality of global models based on encoded reference information for a new local server according to an exemplary embodiment of the present disclosure.

FIG. 6 is a diagram for describing an operation of sharing a hidden layer architecture of any one of a plurality of global models based on encoded reference information for a new local server according to an exemplary embodiment of the present disclosure.

According to an exemplary embodiment of the present disclosure, the computing device 100 may generate first representative reference information for the first cluster by computing a representative value with respect to encoded reference information of local models included in the first cluster. Further, the computing device 100 may generate second representative reference information for the second cluster by computing a representative value with respect to encoded reference information of local models included in the second cluster. In addition, the computing device 100 may use the first representative reference information as tag information of the updated first global model. In addition, the computing device 100 may use the second representative reference information as tag information of the updated second global model.

Exemplarily, referring to FIG. 5, the computing device 100 may obtain one or more encoded reference information A. The one or more encoded reference information (A) may include first encoded reference information A-1 [first local model, data type: image, task: semiconductor defect detection], second encoded reference information A-2 [second local model, data types: image, task: glass defect detection], third encoded reference information A-3 [third local model, data Type: text, task: client feedback analysis], fourth encoded reference information A-4 [fourth local model, data type: moving image, task: glass defect detection], fifth encoded reference information A-5 [fifth local model, data Type: moving image, task: semiconductor defect detection], . . . , N-th encoded reference information A-N [N-th local model, data type: voice, task: machine defect detection]. In addition, the computing device 100 may embed one or more encoded reference information A into vectors, and calculate a similarity between the embedded vectors. The computing device 100 may compute a representative value for the encoded reference information of the first local model and the fifth local model, included in the first cluster, to generate first representative reference information [data type: image, task: semiconductor defect detection] for the first cluster. The computing device 100 may compute a representative value for the encoded reference information of the second local model and the fourth local model, included in the second cluster, to generate second representative reference information [data type: image, task: glass defect detection] for the second cluster.

Exemplarily, referring to FIG. 6, the computing device 100 may distribute an encoder, which may generate encoded reference information B, to a new local server. The encoder included in the new local server may encode task information or data type information for local training to generate the encoded reference information B. Further, the computing device 100 may obtain the encoded reference information B from the new local server. Further, the computing device 100 may compute a similarity of the encoded reference information B obtained from the new local server, tag information of the first global model, and tag information of the second global model. The computing device 100 may share a hidden layer architecture of the first global model similar to the encoded reference information B obtained from the new local server. That is, the computing device 100 may share (distribute) the hidden layer architecture of the global model that is highly similar to the encoded reference information B obtained from the new local server to the new local server, so that the new local server may use a training pattern of the global model, which may contribute to increasing the training efficiency and improving the performance of the local model.

The steps mentioned in the above description may be further split into additional steps, or combined into fewer steps according to an implementation example of the present disclosure. Further, some steps may also be omitted as necessary, and an order between the steps may be changed.

Disclosed is a computer readable medium storing the data structure according to an exemplary embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an availably designed data structure, a computing device can perform operations while using the resources of the computing device to a minimum. Specifically, the computing device can increase the efficiency of operation, read, insert, delete, compare, exchange, and search through the availably designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

In the present disclosure, a network function, an artificial neural network, and a neural network may be used to be exchangeable. From here on, it will be described uniformly using neural networks.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of training cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 7:
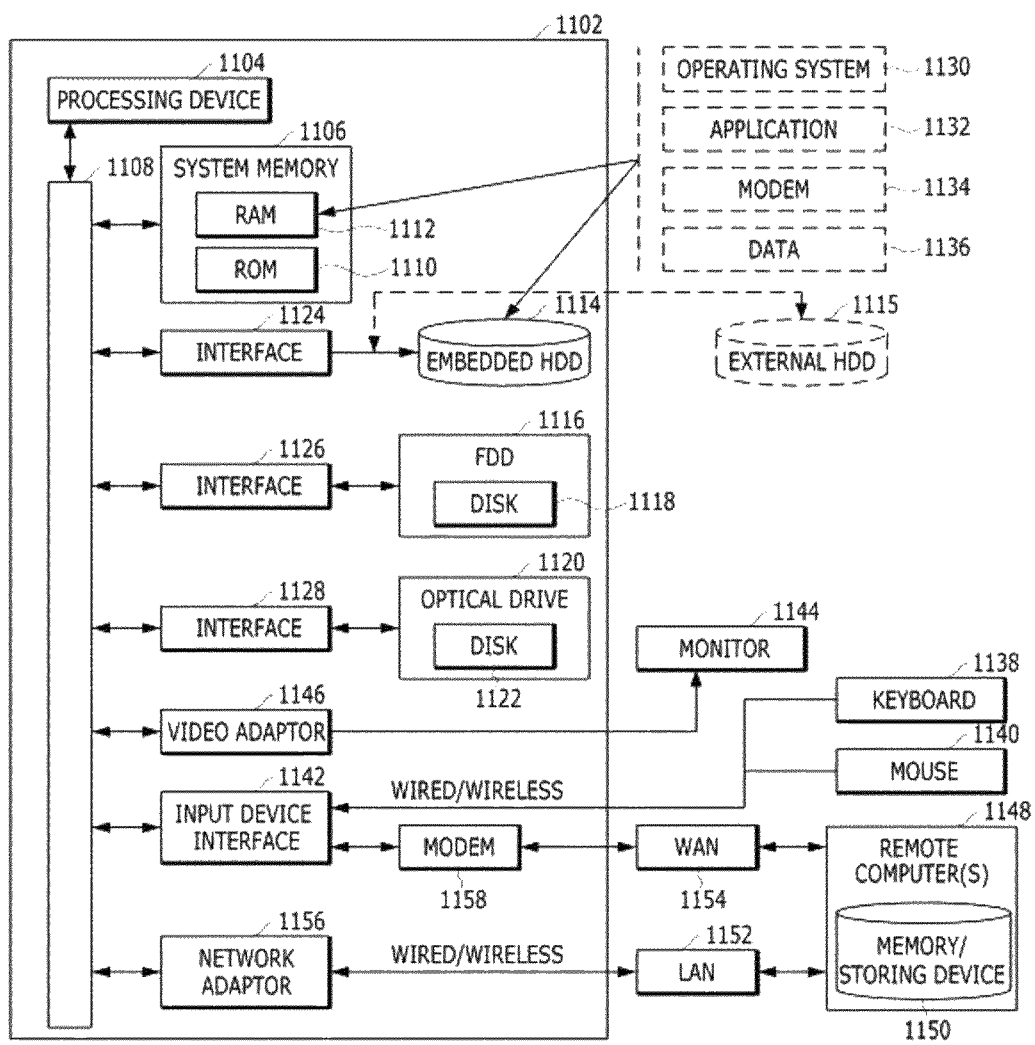
FIG. 7 is a simple and normal schematic view of an exemplary computing environment in which the exemplary embodiments of the present disclosure may be implemented.

FIG. 7 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal obtained by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them. The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure. Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for managing a local model and a global model on an AI platform, the method performed by one or more processors of a computing device, the method comprising:
    obtaining one or more encoded reference information, generated by encoding task information or data type information related to local training performed by one or more local servers;
    obtaining at least a part of parameter information of one or more local models locally trained by the one or more local servers;
    clustering the one or more local models based on the one or more encoded reference information; and
    updating a global model based on the one or more encoded reference information and at least a part of the parameter information of the one or more local models, and
    wherein updating of the global model further comprises:
    generating first representative reference information for a first cluster by computing a representative value from encoded reference information of local models included in the first cluster;
    generating second representative reference information for a second cluster by computing a representative value from encoded reference information of local models included in the second cluster;
    using the first representative reference information as tag information of an updated first global model; and
    using the second representative reference information as tag information of an updated second global model,
    wherein the updating of the global model includes:
    updating the first global model by using parameter information of local models included in the first cluster; and
    updating the second global model by using parameter information of local models included in the second cluster.

2. The method of claim 1, wherein the AI flatform includes an MLOps (Machine Learning Operations) platform implemented through interconnection between a central server and the one or more local servers,
    wherein the central server performs operations of managing a frontend operation of the MLOps platform, an authentication operation, and an operation for managing information about the one or more local models and the global model, and
    wherein each of the one or more local servers performs operations of managing a backend operation of the MLOps platform and managing information regarding each of the one or more local models.

3. The method of claim 1, wherein the one or more local models and the global model are trained based on federated learning.

4. The method of claim 1, wherein the one or more local models shares a same hidden layer architecture.

5. The method of claim 1, wherein the clustering the one or more local models includes:
including models among the one or more local models in a same cluster when a similarity of encoded reference information between the local models is equal to or greater than a threshold.

6. The method of claim 1, wherein the obtaining one or more encoded reference information and the obtaining at least the part of the parameter information for the one or more local models are performed with a time difference.

7. The method of claim 6, wherein the obtaining one or more encoded reference information is performed before an operation of identifying a model among the one or more local models to be used for updating the global model,
wherein the obtaining at least the part of the parameter information of the one or more local models is performed after the operation of identifying the model among the one or more local models to be used for updating the global model, and is performed for the identified model.

8. A computer program stored in a non-transitory computer-readable storage medium, wherein the computer program causes one or more processors to perform operations for managing a local model and a global model on an AI platform when the computer program is executed by the one or more processors, the operations comprising:
an operation of obtaining one or more encoded reference information, generated by encoding task information or data type information related to local training performed by one or more local servers;
an operation of obtaining at least a part of parameter information of one or more local models locally trained by the one or more local servers;
an operation of clustering the one or more local models based on the one or more encoded reference information; and
an operation of updating a global model based on the one or more encoded reference information and at least a part of the parameter information of the one or more local models, and
wherein the operation of updating of the global model further comprises:
an operation of generating first representative reference information for a first cluster by computing a representative value from encoded reference information of local models included in the first cluster;
an operation of generating second representative reference information for a second cluster by computing a representative value from encoded reference information of local models included in the second cluster;
an operation of using the first representative reference information as tag information of an updated first global model; and
an operation of using the second representative reference information as tag information of an updated second global model,
wherein the operation of updating of the global model includes:
an operation of updating the first global model by using parameter information of local models included in the first cluster; and
an operation of updating the second global model by using parameter information of local models included in the second cluster.

9. The computer program of claim 8, wherein the AI flatform includes an MLOps (Machine Learning Operations) platform implemented through interconnection between a central server and the one or more local servers,
wherein the central server performs operations of managing a frontend operation of the MLOps platform, an authentication operation, and an operation for managing information about the one or more local models and the global model, and
wherein each of the one or more local servers performs operations of managing a backend operation of the MLOps platform and managing information regarding each of the one or more local models.

10. The computer program of claim 8, wherein the one or more local models and the global model are trained based on federated learning.

11. The computer program of claim 8, wherein the one or more local models shares a same hidden layer architecture.

12. The computer program of claim 8, wherein the operation of obtaining one or more encoded reference information and the operation of obtaining at least the part of the parameter information of the one or more local models are performed with a time difference.

13. A computing device for managing a local model and a global model in an AI platform, comprising:
at least one processor; and
a memory,
wherein the at least one processor is configured to:
obtain one or more encoded reference information, generated by encoding task information or data type information related to local training performed by one or more local servers;
obtain at least a part of parameter information of one or more local models locally trained by the one or more local servers;
cluster the one or more local models based on the one or more encoded reference information; and
update a global model based on the one or more encoded reference information and at least a part of the parameter information of the one or more local models, and
wherein updating of the global model further comprises:
generating first representative reference information for a first cluster by computing a representative value from encoded reference information of local models included in the first cluster;
generating second representative reference information for a second cluster by computing a representative value from encoded reference information of local models included in the second cluster;
using the first representative reference information as tag information of an updated first global model; and
using the second representative reference information as tag information of an updated second global model,
wherein the updating of the global model includes:
updating the first global model by using parameter information of local models included in the first cluster; and
updating a second global model by using parameter information of local models included in the second cluster.

14. The computing device of claim 13, wherein the AI flatform includes an MLOps (Machine Learning Operations) platform implemented through interconnection between a central server and the one or more local servers, wherein the central server performs operations of managing a frontend operation of the MLOps platform, an authentication operation, and an operation for managing information about the one or more local models and the global model, and wherein each of the one or more local servers performs operations of managing a backend operation of the MLOps platform and managing information regarding each of the one or more local models.

15. The computing device of claim 13, wherein the one or more local models and the global model are trained based on federated learning.

16. The computing device of claim 13, wherein the one or more local models shares a same hidden layer architecture.

17. The computing device of claim 13, wherein the obtaining one or more encoded reference information and the obtaining at least the part of the parameter information of the one or more local models are performed with a time difference.

* * * * *